Patented Aug. 18, 1942

2,293,027

UNITED STATES PATENT OFFICE 2,293,027

MONOBUTYLOL CYANAMIDE COMPOUND

Walter P. Ericks, Cos Cob, Conn., assignor to American Cyanamid Company, New York, N. Y., a corporation of Maine No Drawing. Application August 10, 1939, Serial No. 289,398

1 Claim. (Cl. 260—551)

This invention relates to new mono-butylol cyanamide compounds.

I have found that when one mole equivalent of a compound containing an ethylene oxide ring and comprising more than two carbon atoms is reacted with one mole equivalent of an alkaline earth metal cyanamide in an aqueous solution, new alcohol derivatives of cyanamide are obtained.

As a consequence of tautomerism the above type of compounds may occur in several isomeric forms. Possibly two, three, or even four of these isomers may co-exist in a state of equilibrium. According to physical or chemical influence one of these isomers will predominate and I therefore designate the reaction product as a monomeric compound with an open chain structure of the following representative formula:

$$N \equiv C.NH.R.OH$$

in which R is an alkyl or a substituted alkyl group comprising more than two carbon atoms. These products are all extremely reactive and polymerize readily upon heating at a temperature exceeding 65° C. to the dimer which has the following probable structural formula:

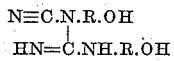

$$N \equiv C.N.R.OH$$
$$\quad \ \ \ |$$
$$HN = C.NH.R.OH$$

in which R is as defined above. Upon additional heating further polymerization may occur with the possible formation of tri-substituted triazines.

The new alkylol cyanamides may be prepared as follows: An aqueous slurry of an alkaline earth metal cyanamide is prepared by introducing one mole equivalent to the cyanamide compound in small portions into water which is stirred rapidly. One mole equivalent of a compound containing an ethylene oxide ring and comprising more than two carbon atoms is then introduced slowly at atmospheric pressure into the agitated suspension which is maintained at a temperature not exceeding the boiling point of said compound. If desired the reaction may be carried out at elevated pressures. The mixture is filtered. The filter cake containing the major portion of the alkaline earth metal as an insoluble is washed with water. A precipitant such as carbon dioxide is passed into the combined filtrate and washings to throw out the residual alkaline earth metal as a substantially insoluble compound which is filtered off. The alkylol cyanamide is obtained from the filtrate after removing the water by evaporation at low temperatures. Since these products polymerize readily, high evaporation temperatures should be avoided. A compromise between undesirably high and uneconomically low temperatures indicate 65° C. as an optimum at atmospheric pressure. It is preferable to carry out the evaporation under reduced pressure of 10–20 mm. mercury as in such case lower evaporating temperatures may be used.

The cyanamide material used in the following example is crude calcium cyanamide known to the trade as Cyanamid.

The materials employed in the example are in parts by weight.

Monobutylol cyanamide 134 parts of Cyanamid (60.6% NCNCa) were introduced in small portions into 350 parts of water, which were stirred rapidly at a temperature not exceeding 25° C. 72 parts of isobutylene oxide were introduced slowly into the agitated suspension, keeping the temperature below 25° C. After the butylene oxide had been added, the mixture was stirred for two hours, filtered and the filter cake washed with water. Carbon dioxide was passed into the combined filtrate and washings to precipitate the remaining calcium as carbonate. The mixture was agitated with four parts of charcoal, then filtered and the filtrate evaporated at a temperature of about 65° C. The product was a colorless viscous liquid.

Similarly other higher members of the alkylol cyanamide series may be obtained by using as a starting material the corresponding compound containing a reactive ethylene oxide ring and a proper substituent in the ethylene ring and reacting the same with an alkaline earth metal cyanamide.

These new compounds are of particular utility in the formulation of coating and molding compositions, as textile assistants, as plasticizers, and as starting materials for the synthesis of artificial fibers, laminated materials, resins, adhesives, and other useful products.

Condensation products of the alkylol cyanamides with organic monocarboxylic acids such as described in my copending application, Ser. No. 278,456, filed June 10, 1939, are surface-active agents of the cation-active type; that is to say, their surface-active properties are due to the electropositive portion of the molecule. For this reason they are well suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for de-emulsification of oil emulsions, in the formulation of printing inks, dye pastes, dye baths, as softeners for leather, as flotation agents, in the application of rubber latex emulsions to wool, cotton and rayon textiles, in preparing emulsions of resins and the like.

In the claim, it will be understood that the term alkylol cyanamide is intended to cover all isomeric forms in which the alkylol cyanamide may exist.

While the invention has been described with particular reference to specific embodiments, it is to be understood that it is not to be limited thereto but is to be construed broadly and restricted solely by the scope of the appended claim.

What I claim is:

As a new compound monobutylol cyanamide.

WALTER P. ERICKS.